US012632197B2

(12) United States Patent
Jha et al.

(10) Patent No.: US 12,632,197 B2
(45) Date of Patent: May 19, 2026

(54) UNIVERSAL FLASH STORAGE DEVICE WITH PARTIAL BUFFER FLUSH AND FLUSH RESUME FUNCTIONS

(71) Applicant: QUALCOMM Incorporated, San Diego, CA (US)

(72) Inventors: Pratibind Kumar Jha, Hyderabad (IN); Manish Garg, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 17 days.

(21) Appl. No.: 18/519,031

(22) Filed: Nov. 26, 2023

(65) Prior Publication Data

US 2025/0173090 A1     May 29, 2025

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC ..... G06F 3/0656; G06F 3/0604; G06F 3/0679
See application file for complete search history.

(56) References Cited

U.S. PATENT DOCUMENTS

| | | | | |
|---|---|---|---|---|
| 2013/0107655 A1* | 5/2013 | Goel | ......................... | G11C 8/06 365/230.01 |
| 2019/0042140 A1* | 2/2019 | Natarajan | ............... | G06F 3/068 |

| | | | | |
|---|---|---|---|---|
| 2019/0179777 A1* | 6/2019 | Born | ......................... | G06F 5/14 |
| 2019/0258568 A1 | 8/2019 | Park et al. | | |
| 2019/0294542 A1 | 9/2019 | Lee | | |
| 2021/0271595 A1* | 9/2021 | Chen | ................... | G06F 12/0868 |
| 2023/0376206 A1 | 11/2023 | Wang et al. | | |

OTHER PUBLICATIONS

"Understanding the WriteBooster Feature" Technical Brief retrieved at https://americas.kioxia.com/content/dam/kioxia/en-us/business/memory/mlc-nand/asset/KIOXIA_WriteBooster_Feature_Tech_Brief.pdf on Oct. 5, 2024; (Published Dec. 2022) (Year: 2022).*
International Search Report and Written Opinion—PCT/US2024/050074—ISA/EPO—Nov. 18, 2024.

* cited by examiner

*Primary Examiner* — Prasith Thammavong
(74) *Attorney, Agent, or Firm* — Muncy, Geissler, Olds & Lowe, P.C.

(57) ABSTRACT

Methods that may be performed by a universal flash storage (UFS) system of a computing device that provide a write booster buffer partial flush process and a flush resume/retry process in a flash storage device. The method for managing operations of a write booster buffer of a flash memory device includes notifying a host controller that a flush of the write booster buffer has been terminated, transmitting, to the host controller, context information describing one or more data structures that were successfully flushed. The method may include receiving a partial unmap command from the host controller to unmap the one or more data structures that were successfully flushed and may include resuming the flush of the write booster buffer.

28 Claims, 10 Drawing Sheets

200

100

200

400

FLASH Memory Device 402

Electronic Storage 420

Write Booster Buffer 118

Processor(s) 422

Machine-Readable Instructions 406

Write Booster Buffer Module 430

Write Booster Communication Module 432

Progress Tracking Module 436

Flush Management Module 438

424

418

Host Device

750

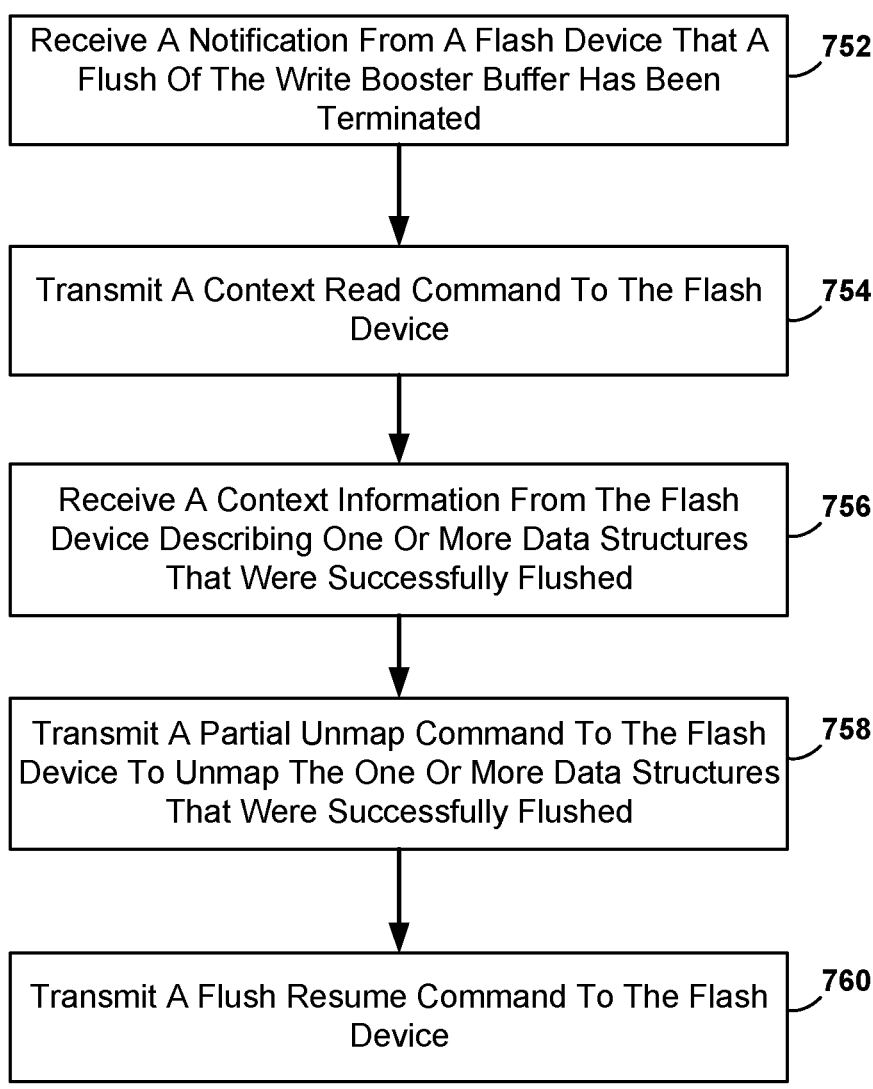

| Receive A Notification From A Flash Device That A Flush Of The Write Booster Buffer Has Been Terminated | 752 |

| Transmit A Context Read Command To The Flash Device | 754 |

| Receive A Context Information From The Flash Device Describing One Or More Data Structures That Were Successfully Flushed | 756 |

| Transmit A Partial Unmap Command To The Flash Device To Unmap The One Or More Data Structures That Were Successfully Flushed | 758 |

| Transmit A Flush Resume Command To The Flash Device | 760 |

FIG. 7B

UNIVERSAL FLASH STORAGE DEVICE WITH PARTIAL BUFFER FLUSH AND FLUSH RESUME FUNCTIONS

BACKGROUND

Developers and users of computing devices are always seeking improved operation performance and endurance. In some computing devices, such as buffers and cache memory elements, flushing of the buffer or cache to longer-term storage may be a frequent process to free the buffer or cache for receiving further data. An error or fault encountered during flushing can result in the memory tables of the device and controller being out of sync and the status of one or more data structures in the memory being indeterminate. As a result, re-synchronizing and starting over is time consuming and error prone.

SUMMARY

Various aspects may further include methods performed by a universal flash storage (UFS) system of a computing device for writing data to a flash storage device with a write booster buffer that records a flush progress position. Various aspects may include notifying a host controller that a flush of the write booster buffer has been terminated, transmitting to the host controller context information describing one or more data structures that were successfully flushed and resuming the flush of the write booster buffer. In some aspects, the one or more data structures may be a plurality of levels, addresses, or blocks in write booster buffer memory indicated as flushed or not-flushed by a plurality of flush points corresponding to the plurality of levels, addresses, or blocks.

In some aspects, transmitting the context information may include transmitting a flush completion position indicating a last successful flush point in the flush of the write booster buffer, and resuming the flush may include resuming the flush starting from the flush completion position provided in the context information.

Some aspects may further include receiving a context read command from the host controller and transmitting the context information to the host controller in response to receiving the context read command. Some aspects may further include receiving a flush resume command from the host controller and resuming the flush of the write booster buffer in response to receiving the flush resume command. Some aspects may further include the one or more data structures are one or more levels, addresses, or blocks of write booster buffer memory. Some aspects may further include receiving a partial unmap command from the host controller to unmap the one or more data structures that were successfully flushed and resuming the flush starting from a flush completion position in the context information.

Further aspects include a flash storage device including a device controller configured to perform operations of any of the methods summarized above. Further aspects include a computing device including a flash storage device controller and a host controller configured to perform operations of any of the methods summarized above. Further aspects include a flash storage device including means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

FIG. 7B is a process flow diagram of an example method of write booster buffer partial flush and resume in accordance with some embodiments.

DETAILED DESCRIPTION

Figure 1:
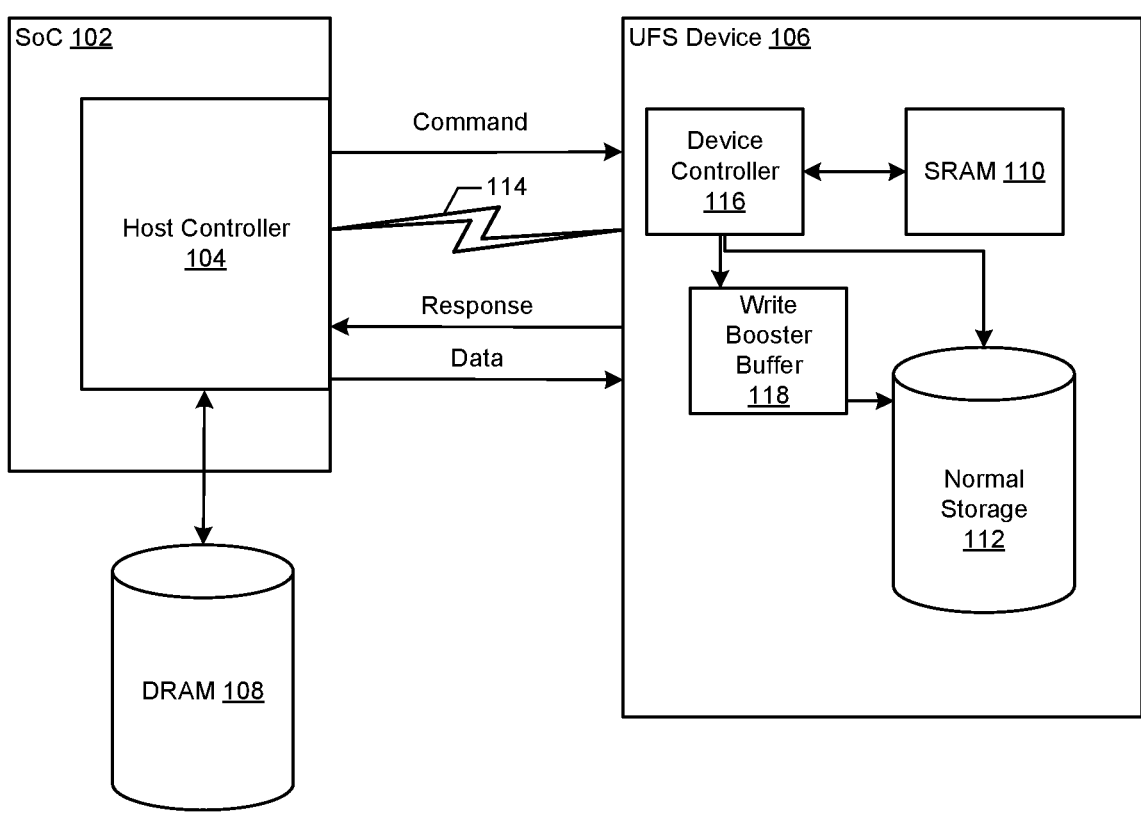
FIG. 1 is a system block diagram illustrating an example flash storage memory system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and computing devices for implementing the methods for enabling write booster buffer partial flush and resume processes in a flash storage device. Various embodiments may include methods performed by a universal flash storage (UFS) system of a computing device including notifying a host controller that a flush of the write booster buffer has been terminated, receiving a context read command from the host controller, and transmitting, to the host controller, context information describing one or more data structures that were successfully flushed.

Various embodiments may include methods performed by a universal flash storage (UFS) system of a computing device that may include receiving a partial unmap command from the host controller to unmap the one or more data structures that were successfully flushed, receiving a flush resume command from the host controller, and resuming the flush of the write booster buffer. The universal flash storage (UFS) system of a computing device may resume the flush starting from a flush completion position provided in the context information.

More generally, a UFS device may operate as a storage module with a plurality of logical units (LU) and may include a write booster buffer to increase the speed of data writes to the device (e.g., before placement in normal storage). A majority of the storage volumes may be triple level cell (TLC) NAND memory elements, while some memory, including the write booster buffer, may be single level cell (SLC) NAND memory elements.

In SLC NAND memory elements, each memory cell stores only one bit of data, representing either a '0' or a '1'. Due to the simplicity of storing a single bit per cell, SLC memory has several advantages, including faster write and read speeds, higher endurance and lower error rates.

In TLC NAND memory elements, each memory cell stores three bits of data, resulting in eight possible voltage levels. While this increases the storage density, it also introduces a few trade-offs compared to SLC memory, including slower write and read speeds, lower endurance and higher error rates.

The normal storage of the flash device may be TLC NAND and the flash device (e.g., UFS device) may include a write buffer of SLC NAND memory elements that temporarily stores received data before transferring the data to normal storage in the TLC NAND memory. This process of transferring the temporarily stored data to normal storage may be called flushing. A flush typically transfers all of the data in the write booster buffer to normal storage as a single flush process. Errors, faults, and terminations that occur during a flush are difficult to recover from and may result in significant error checking and correction by both the host controller and the flash device.

An error in flushing operations may occur during a flush in some operating conditions supporting many applications when a system exception occurs, such as device driver bugs, device controller halts, insufficient TLC storage, hardware component failure, a synchronization issue at a turbo write buffer (TWB) or device controller, or a security restriction. For example, memory tables in a TWB and device controller may come out of sync with each other or come out of sync with memory tables at a host controller. Additionally, a hardware fault, such as a faulty cable, electrical short, static charge, loose connections, or compatibility issues, may introduce errors and faults into the flush process or SLC to TLC.

Upon recognizing a fault at the flash device, the device controller of the flash device may generate an error code or set a flush status (e.g., bWriteBoosterBufferFlushStatus=04 h). This error may not be easily repaired nor the flush retried in the present designs, which results in generalized error remapping or full failure of the buffer. For example, in the case of an error part-way through a flush, the SLC buffer may be occupied with existing data (e.g., unflushed data). Since the flush is an internal operation of the flash device, the host controller may not be aware of the flush failure. The host controller may not re-try to flush again because it is unaware. The host controller further may not be able to write data to the SLC buffer because it may be full since no un-mapping has been done. Un-mapping or synchronization of the mapping tables may be done only for successfully flushed data when flush operation failed with general failure, which may be the entire SLC buffer. This may mean that the entire SLC buffer becomes unavailable. The host controller may then be forced to write directly to TLC, which degrades write speed.

Various embodiments address and overcome the foregoing problems of inability to re-map memory tables after a partial flush and an inability to resume a flush from a particular point in the SLC buffer based on the prior partial flush. Various embodiments enable a flash device to notify a host controller that a flush of the write booster buffer has been terminated, receive a context read command from the host controller, and transmit, to the host controller, context information describing one or more data structures that were successfully flushed. This enables a host controller to be informed of an error in a flush so that it does not assume that the flush has been successful and enables the host controller to receive context information regarding the failure including a point of failure in the process.

The host controller may unmap or remap its memory tables based on the context information and may transmit to the flash device a partial unmap command to unmap the one or more data structures that were successfully flushed at the flash device. The host controller may then transmit and the flash device may receive a flush resume command from the host controller, and the flash device may resume the flush of the write booster buffer. In some embodiments, the write booster buffer includes a number of flush points or check points that correspond to segments of the write booster buffer that are triggered or recorded during a flush as successful or unsuccessful. A UFS device controller may then access the recorded flush checkpoint data to provide the last successful checkpoint to the host controller as context information so the host controller may be able to update its memory tables. In some embodiments, the flash device may use the check point data to identify (or the host controller may provide) a point (e.g., memory address) in the write booster buffer from which to resume the flush. The flash device may then resume the flush and notify the host controller of the result, which may restart this process if an error occurs.

The term "system-on-a-chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SoCs may also include software for controlling the integrated resources and processors, as well as for controlling peripheral devices. The host controller may form a portion of the SoC and the UFS device may form a portion of the SoC.

The term "system-in-a-package" (SIP) may be used herein to refer to a single module or package that contains multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SoCs coupled together via high-speed communication circuitry and packaged in close proximity, such as on a single motherboard or in a single computing device. The proximity of the SoCs facilitates high speed communications and the sharing of memory and resources.

As used herein, the term "processing system" is used herein to refer to one more processors, including multi-core processors, that are organized and configured to perform various computing functions. Various embodiment methods may be implemented in one or more of multiple processors within a vehicle processing system as described herein.

FIG. 1 is a system block diagram illustrating an example flash storage system suitable for implementing any of the various embodiments. The system 100 may include one or more computing devices or processors connected to a UFS device 106 for storage. For example, the system 100 may include an SoC 102 including a host controller 104, a dynamic random access memory (DRAM) 108 communicably connected to the host controller 104, and a UFS device 106 communicably connected to the host controller 104 via a link 114. The host controller 104 may include a processor (not shown separately) configured to perform operations of the host controller described herein. The host controller 104 may maintain and access stored data in DRAM 108 or an SRAM (not shown) integral to the SoC 102, and/or the host controller 104. The UFS device 106 may include a device controller 116, a static random access memory (SRAM) 110, a write booster buffer (e.g., SLC NAND memory) 118, and a normal storage (e.g., TLC NAND memory) 112. The device controller 116 may include one or more processors, which may be configured as a processing system configured to implement operations of various embodiments. The device controller 116 may be coupled to the SRAM 110 and the normal storage 112, such that the device controller 116 may store memory tables for normal storage 112 in SRAM 110. The write booster buffer 118 may be coupled with the device controller 116 and the normal storage 112, such that the write booster buffer buffers data written from the host controller 104 via the device controller 116 to the normal storage 112. The normal storage 112 may be coupled with the device controller 116 to store data written from the host controller 104 when the device controller 116 has been instructed to bypass the write booster buffer 118.

The host controller 104 may implement write transactions to the UFS device 106. The write transactions may include the host controller 104 issuing write commands from other components of the SoC 102 and/or from components communicably connected to the SoC 102 (e.g., via I/O of the SoC) to the device controller 116. The host controller 104 may implement one or more memory management commands to the UFS device 106 including flush commands, unmap commands, and remap commands. The host controller 104 may store one or more memory tables on DRAM 108 that may synchronize with data tables on SRAM 110 that describe locations of data in normal storage 112 and write booster buffer 118. In addition to commands and data from the host controller 104, the device controller 116 may respond with information (e.g., state variables, device status) and data (e.g., such as that data previously received and stored in the flash storage device (UFS device 106)) via link 114.

The device controller 116 receiving the write commands and data from the host controller 104 may write the data to the write booster buffer 118. The device controller 116 may manage the write booster buffer 118 storing the data, including controlling flushing the data from the write booster buffer 118 to the normal storage 112. The device controller 116 may implement flushing the data from the write booster buffer 118 to the normal storage 112 periodically, episodically, or at the command of the host controller 104. The device controller 116 may maintain a memory mapping table at the UFS device 106 with addresses at the normal storage 112 and write booster buffer 118. The memory table may include parameters and controls for different portions of normal storage 112, such as a logical unit number (LUN) for each of a plurality of logical units of memory in normal storage 112.

In some embodiments, the device controller 116 may be configured to update a memory table after a flush of the write booster buffer 118. The device controller 116 may define one or more checkpoints at particular addresses within the write booster buffer 118 and may record a progress of a flush through the one or more checkpoints. Further, after a flush, the device controller 116 may unmap the flushed addresses of the write booster buffer 118 to free them for further writes (overwrites) by the host controller 104 and may inform the write booster buffer 118 of the flushed addresses or the successful flush so that it may write data to those unmapped portions of memory in the write booster buffer 118. In some embodiments, the device controller 116 may be configured to manage a flush process including recording flush progress, sharing flush status and context with the host controller, and resuming the flush after a premature termination. In this manner, the device controller may provide advantageous flush capabilities and advantageous flush status communication with the host controller.

The host controller 104 may implement read transactions at the UFS device 106. Read transactions may include the host controller 104 issuing read requests from other components of the SoC 102 and/or from components communicably connected to the SoC 102 (e.g., via I/O of the SoC) to the device controller 116. Read transactions may include transferring the addresses to be read from the host controller 104 to the device controller 116. The read addresses may be physical addresses corresponding to logical addresses received by the host controller 104 from the other components of the SoC 102 and/or from components communicably connected to the SoC 102. Read transactions may be subsequent to write transactions and may read the written data out of the normal storage 112. As illustrated, the host controller 104 may transmit commands and data to the UFS device 106 over link 114 and the UFS device 106 may transmit a response which acknowledges receipt and/or requests the next transmission.

Figure 2:
FIG. 2 is a system block diagram illustrating an example flash storage memory system suitable for implementing any of the various embodiments.
Figure 2:
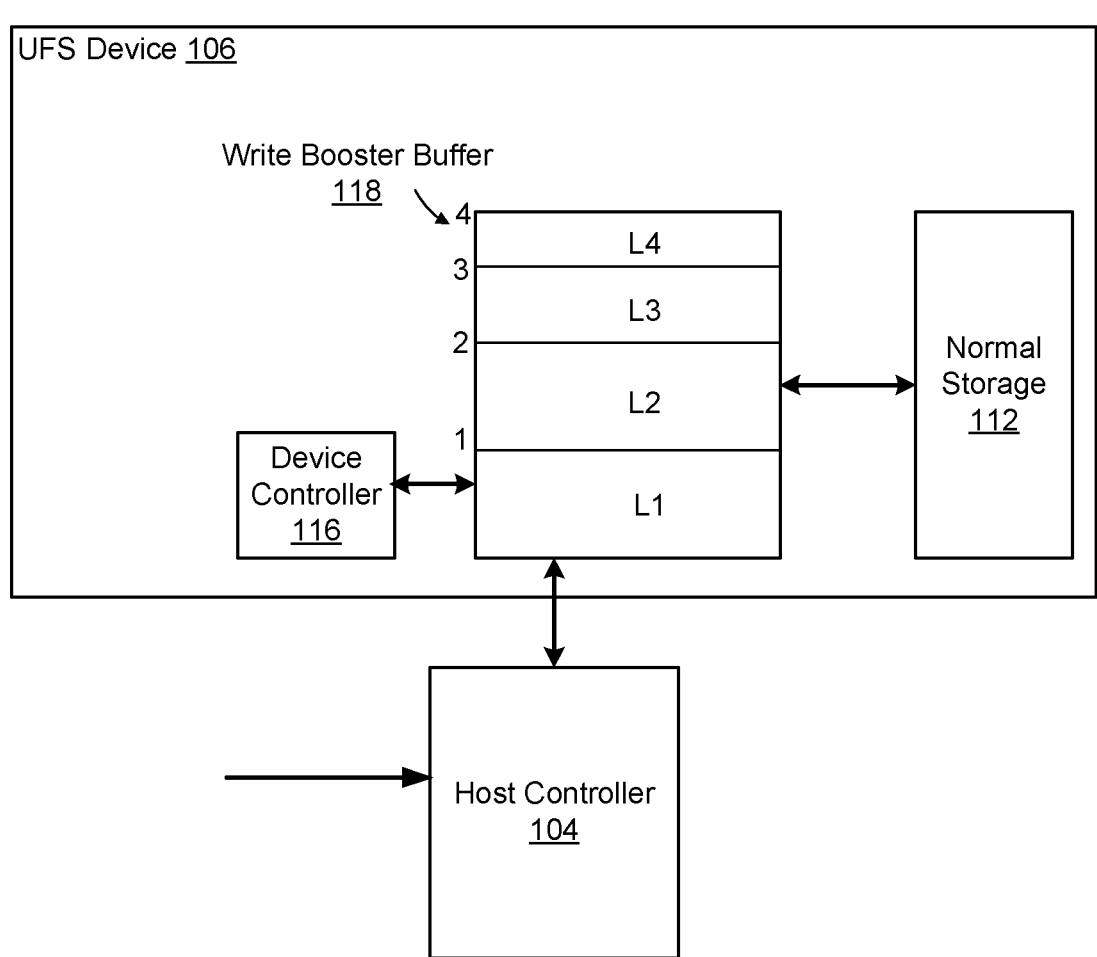

FIG. 2 is a system block diagram illustrating an example flash storage memory system 200 suitable for implementing any of the various embodiments. With reference to FIGS. 1 and 2, the illustrated example UFS device 106 includes a device controller 116 which may include a processing system, a write booster buffer 118, and normal storage 112. The normal storage 112 may include a plurality of logical unit numbers (LUNs) that may correspond to blocks of logical addresses of TLC NAND memory. The device controller 116 may be connected to the write booster buffer 118 and may include one or more processors in a processing system configured to send commands and requests to the write booster buffer 118. For example, the device controller 116 may command the write booster buffer 118 to flush data to normal memory 112 or may process a read command to read data in the write booster buffer 118 out to the host controller 104, or other control commands as described in the UFS 4.0 specification or updates thereof.

As illustrated, data flows from the host controller 104 may be directed to the write booster buffer 118 first for quicker throughput to the UFS device 106. Eventually some or all the data in the write booster buffer 118 is flushed by the device controller 116. After a write of data is completed to the write booster buffer 118 or normal storage 112, the device controller 116 may transmit a response to the host controller 104. As described with respect to FIG. 1, the host controller 104 may transmit data for writing into one or more data structures of the write booster buffer 118 (e.g., L1, L2, L3, L4). The data structures L1-L4 may include one or more addresses associated with a checkpoint (e.g., illustrated as lines 1-4 between data structures in 118) such that when the address corresponding to the checkpoint is flushed, the device controller 116 may record the flush of the data structure (e.g., L2) as complete. The number and organization of the data structure L1-L4 illustrated are a non-limiting example and may be any non-zero integer number. The entire write booster buffer 118 may be divided into data structures (e.g., multiple data structures) with corresponding flush points that indicate whether each data structure of the write booster buffer was successfully flushed or not.

A host controller 104 may command data transmitted to the write booster buffer 118 to be stored in any of the data structures and the device controller 116 may individually address and map one or more addresses and one or more data structures which may contain one or more addresses. For example, the device controller 116 may operate to flush an individual data structure (e.g., L3) or write data to an individual data structure (e.g., L4) or may fill data structure L3 before filling data structure L1. The data structures L1-L4 may be filled sequentially, randomly, or by other organizing schemes with the stored data locations reflected in one or more memory tables on the UFS device 106.

Figure 3:
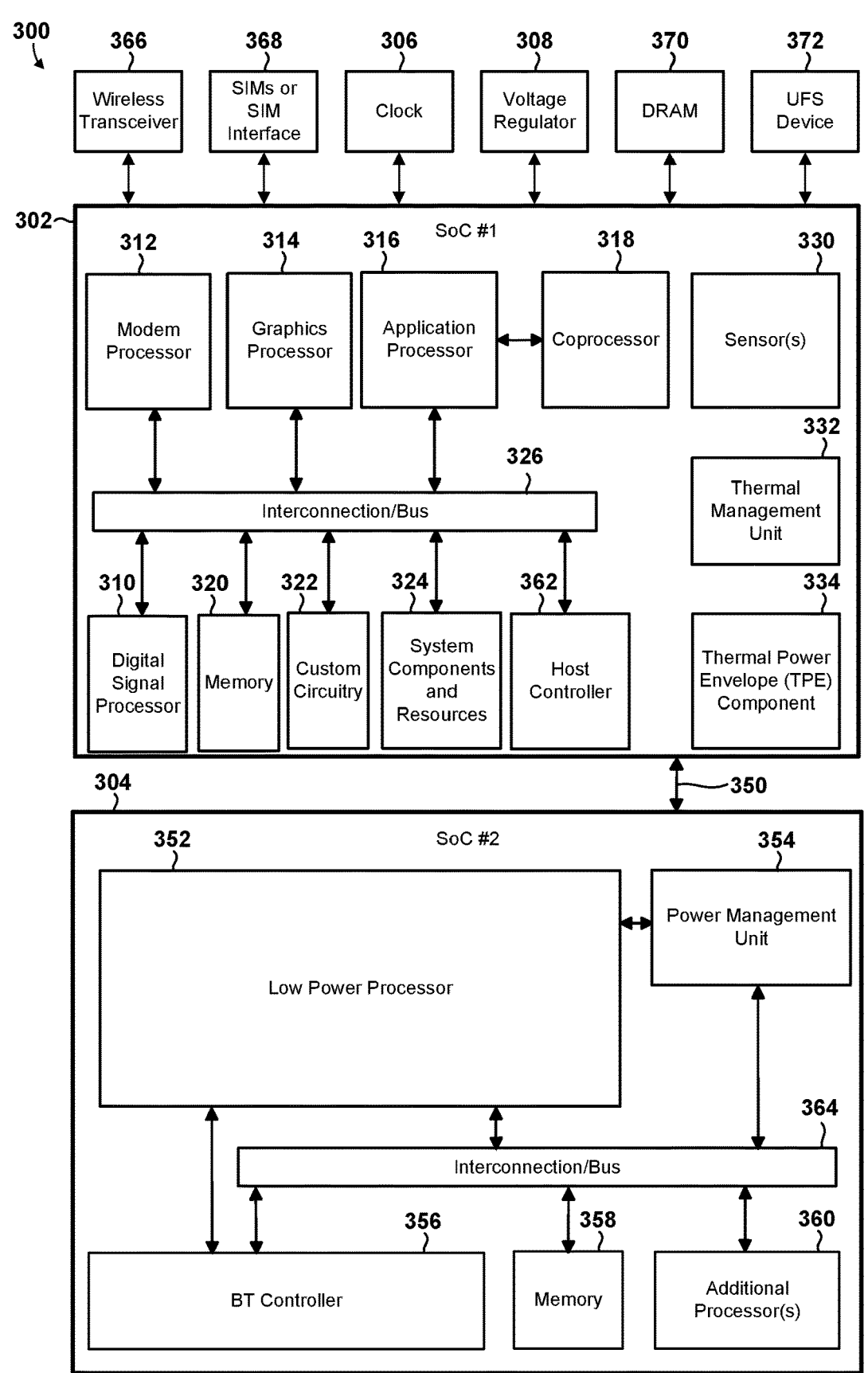
FIG. 3 is a component block diagram illustrating an example computing device suitable for implementing any of the various embodiments.

FIG. 3 is a component block diagram illustrating an example computing device 300 suitable for implementing any of the various embodiments. Various embodiments may be implemented on a number of single-processor and multi-processor computer systems, including a system-on-chip (SoC) or system in a package (SIP).

With reference to FIGS. 1-3, the illustrated example computing device 300 (which may be a system-in-a-package in some embodiments) includes a two SoCs 302 (e.g., SoC 102), 304 coupled to a clock 306, a voltage regulator 308, at least one subscriber identity module (SIM) 368 and/or a SIM interface, a DRAM 370 (e.g., DRAM 108), a UFS device 372 (e.g., UFS device 106) for storage, a wireless transceiver 366 configured to send and receive wireless communications via an antenna (not shown) to/from wireless computing devices, such as a base station, wireless device, and/or computing device (e.g., system 100). In some embodiments, the first SoC 302 may operate as central processing unit (CPU) of the computing device 300 that carries out the instructions of software application programs by performing the arithmetic, logical, control and input/output (I/O) operations specified by the instructions. In some embodiments, the second SoC 304 may operate as a specialized processing unit. For example, the second SoC 304 may operate as a specialized 5G processing unit responsible for managing high volume, high speed (e.g., 5 Gbps, etc.), and/or very high frequency short wavelength (e.g., 28 GHz mmWave spectrum, etc.) communications.

The first SoC 302 may include a digital signal processor (DSP) 310, a modem processor 312, a graphics processor 314, an application processor (AP) 316, one or more coprocessors 318 (e.g., vector co-processor) connected to one or more of the processors, memory 320 (e.g., DRAM 108), custom circuitry 322, system components and resources 324, a host controller 362 (e.g., host controller 104), an interconnection/bus module 326, one or more sensors 330 (e.g., accelerometer, temperature sensor, pressure sensor, optical sensor, infrared sensor, analog sound sensor, etc.), a thermal management unit 332, and a thermal power envelope (TPE) component 334. The second SoC 304 may include a low power processor 352, a power management unit 354, an interconnection/bus module 364, a BT controller 356, memory 358, and various additional processors 360, such as an applications processor, packet processor, etc.

Each processor 310, 312, 314, 316, 318, 352, 360 may include one or more cores, and each processor/core may perform operations independent of the other processors/cores. For example, the first SoC 302 may include a processor that executes a first type of operating system (e.g., FreeBSD, LINUX, OS X, etc.) and a processor that executes a second type of operating system (e.g., MICROSOFT WINDOWS 10). In addition, any or all of the processors 310, 312, 314, 316, 318, 352, 360 may be included as part of a processor cluster architecture (e.g., a synchronous processor cluster architecture, an asynchronous or heterogeneous processor cluster architecture, etc.).

The first and second SoC 302, 304 may include various system components, resources, and custom circuitry for managing sensor data, analog-to-digital conversions, wireless data transmissions, and for performing other specialized operations, such as decoding data packets and processing encoded audio and video signals for rendering in a web browser or audio/video application. For example, the system components and resources 324 of the first SoC 302 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 324 and/or custom circuitry 322 may also include circuitry to interface with peripheral devices, such as cameras, electronic displays, wireless communication devices, external memory chips, etc.

The first and second SoC 302, 304 may communicate via interconnection/bus module 350. In some embodiments, the interconnection/bus module may be a connection established by transceiving (i.e., receiving and transmitting) components within both the SoC 302 and SoC 304. For example, the low power processor 352 may include a universal asynchronous receiver-transmitter (UART) and the application processor 316 may include a multiple signal messages (MSM) UART driver that is communicatively connected to the UART of the low power processor 352.

The various processors 310, 312, 314, 316, and 318, may be interconnected to one or more memory elements 320, system components and resources 324, and custom circuitry 322, and a thermal management unit 332 via an interconnection/bus module 326. Similarly, the low power processor 352 may be interconnected to the power management unit 354, the BT controller 356, memory 358, and various additional processors 360 via the interconnection/bus module 364. The interconnection/bus module 326, 350, 364 may include an array of reconfigurable logic gates and/or implement a bus architecture (e.g., CoreConnect, AMBA, etc.). Communications may be provided by advanced interconnects, such as high-performance networks-on chip (NoCs).

In various embodiments, any or all of the processors 310, 312, 314, 316, and 318 in the system may operate as the SoC's main processor, central processing unit (CPU), microprocessor unit (MPU), arithmetic logic unit (ALU), etc. One or more of the coprocessors 318 may operate as the CPU. In addition to the example SIP 100 discussed above, various embodiments may be implemented in a wide variety of computing systems, including a single processor, multiple processors, multicore processors, or any combination thereof.

The first and/or second SoCs 302, 304 may further include an input/output module (not illustrated) for communicating with resources external to the SoC, such as a clock 306, a voltage regulator 308, one or more wireless transceivers 366, and at least one SIM 368 and/or SIM interface (i.e., an interface for receiving one or more SIM cards). Resources external to the SoC (e.g., clock 306, voltage regulator 308) may be shared by two or more of the internal SoC processors/cores.

In addition to the example computing device 300 discussed above, various embodiments may be implemented in a wide variety of computing systems, which may include a single processor, multiple processors, multicore processors, or any combination thereof. In some embodiments, the various processors of the SoC 302 and SoC 304 may be located within a same SoC. For example, the application processor 316 and low power processor 352 may be located within a same SoC, such as in a single SoC of a wearable device, to perform optimized storage routines with the UFS device 372.

Figure 4:
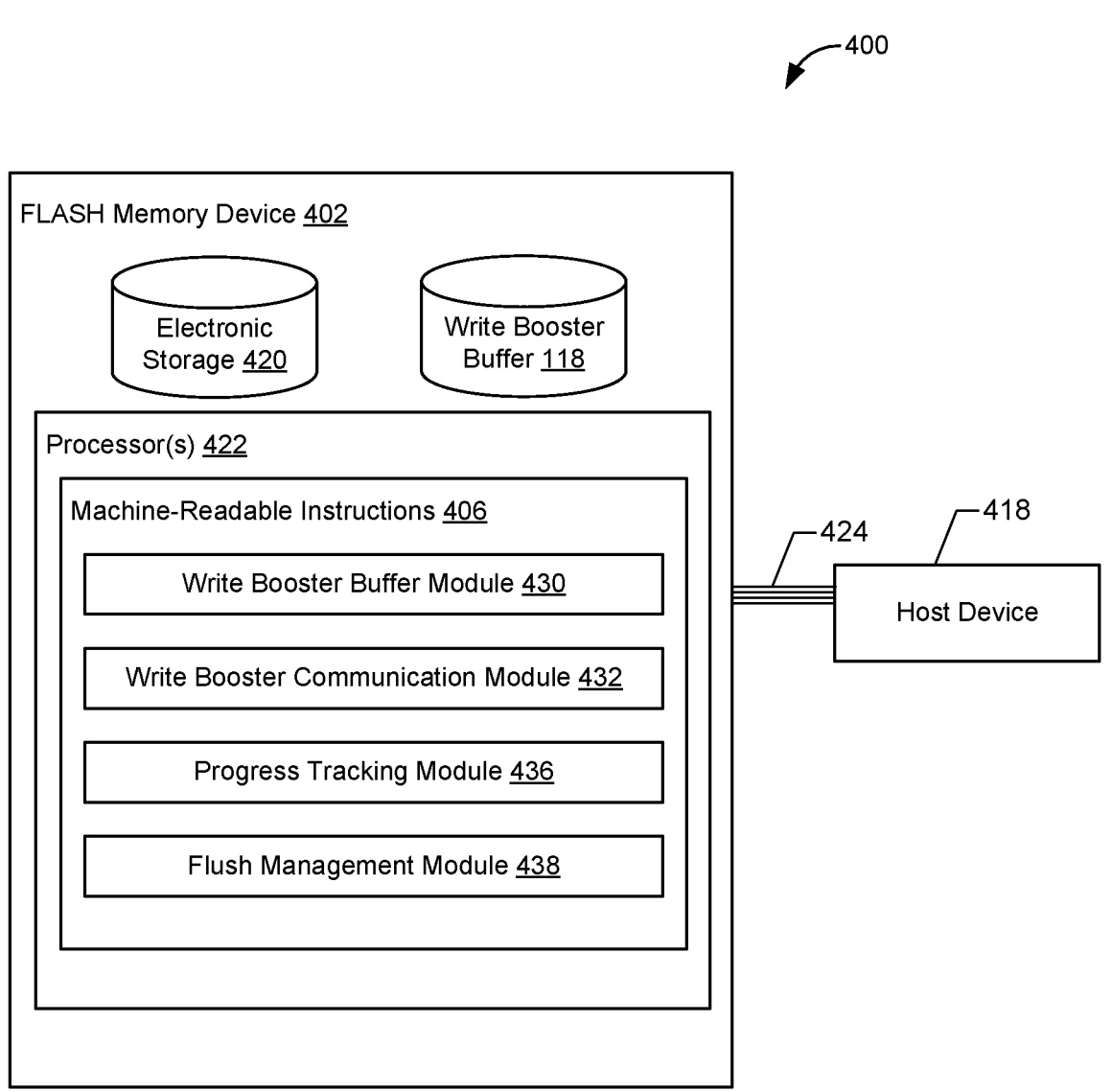
FIG. 4 is a component block diagram illustrating an example system configured to perform write booster buffer partial flush and resume capabilities according to some embodiments.

FIG. 4 is a component block diagram illustrating an example system 400 configured for write booster buffer partial flush and flush resume according to some embodiments. With reference to FIGS. 1-4, the system 400 may include FLASH memory device 402 and a host device 418, which may communicate via a communication link 424 (e.g., link 114). Host device 418 may be a processing system of a computing device that may transmit read and write requests to the FLASH memory device 402. The system 400 may include a plurality of hardware, software, and/or firmware components operating together to provide the functionality attributed herein to the processor(s) 422 (e.g., UFS device controller 116). The FLASH memory device 402 may include a write booster buffer 118 (e.g., write booster buffer 118, SLC NAND memory) that receives and temporarily stores (i.e., buffers) data to be written to and stored in the electronic storage 420 as described herein.

The FLASH memory device 402 may include electronic storage 420 (e.g., normal storage 112), which, together with write booster buffer 118, may be configured to store information as instructed by the processors 422 via machine-readable instructions 406. The electronic storage 420 may include FLASH-type non-transitory storage media (e.g., read-only memory) that electronically stores information. The processor(s) 422 may form a processor system that may execute the modules 430-438. The electronic storage 420 may store software algorithms, information determined by processor(s) 422 of a processing system, and/or other information that enables the FLASH memory device 402 to function as described herein.

The FLASH memory device processor(s) 422 may be configured by machine-readable instructions 406. Machine-readable instructions 406 may include one or more instruction modules. The instruction modules may include computer program modules. The instruction modules may include one or more of a write booster buffer module 430, a write booster communication module 432, a progress tracking module 436, a flush management module 438, and other instruction modules (not illustrated). The FLASH memory device 402 may include one or more processor(s) 422 of a processing system configured to implement the machine-readable instructions 406 and corresponding modules.

In some embodiments, the processor(s) 422 executing the write booster buffer module 430 may be configured to manage a flush of the write booster buffer 118 and may be configured to resume a flush of the write booster buffer 118 after a premature termination. For example, the write booster buffer module 430 may be configured to control implementing a flush of contents of a write booster buffer 118 of the UFS device 402 to a normal storage in the electronic storage 420 (e.g., normal storage 112, TLC NAND memory) of the UFS device. The flush may be implemented periodically, episodically, etc. For example, the flush may be implemented one or more times per read transaction, such as per data read command received at the flash memory device 402. As another example, the flush may be implemented at reaching a capacity threshold for the write booster buffer 118.

In some embodiments, the processor(s) 422 executing the write booster buffer module 430 may be configured to store one or more memory tables to manage the electronic storage 420 (e.g., normal storage 112). These memory tables may map addresses in shared write booster memory and normal storage 112 (e.g., to manage flushing operations). The memory tables may also record progress of a memory flush of the write booster buffer 118 through one or more segments of the write booster buffer 118 or the progress for a flush of one or more data structures (e.g., L1-L4) of the write booster buffer 118. The processor(s) 422 executing the write booster buffer module 430 may be configured to independently assess the need for a flush of the write booster buffer 118 (or a portion thereof) or may be configured to flush the write booster buffer 118 (or a portion thereof) upon receiving a command from the host device 418. The processor(s) 422 executing the write booster buffer module 430 may be configured to transmit a response to a host device 418 (e.g., host controller 104) when a data transmission or portion thereof has been received and stored on the write booster buffer 118.

In some embodiments, the processor(s) 422 executing the write booster communication module 432 may manage and schedule incoming commands and data received at the flash memory device 402 from the host controller 418 to be processed at the write booster buffer 118 or electronic storage 420. For example, the write booster communication module 432 may provide an acknowledgement to the device controller 116 or the host device 418 that data has been fully written and may report its physical or logical address. Likewise, the write booster communication module 432 may acknowledge transfer of data that has been flushed from the write booster buffer 118 so that the device controller 116 or the host device 418 can properly record the updated data location (e.g., physical or logical address). The acknowledgements may include response commands to write transactions from the host device 418 via link 424.

In some embodiments, the processor(s) 422 executing the progress tracking module 436 may be configured to record the progress of a flush of the SLC buffer (e.g., write booster buffer 118) to TLC memory through one or more checkpoints (e.g., 1-4) or through one or more memory addresses. The progress tracking module 436 may include a memory table with one or more rows corresponding to checkpoints at addresses of the write booster buffer 118 such that, when an address or checkpoint is reached, the progress tracking module 436 may set a flag or bit in the corresponding row for the checkpoint. The progress tracking module 436 may communicate the flush status or the flush completion point(s) to the write booster communication module 432, the device controller 116, or the host device 418 (e.g., host controller 104).

In some embodiments, the processor(s) 422 executing the flush management module 438 may be configured to execute a flush according to one or more parameters (e.g., fill level) or according to a command from the host device 418. The flush management module 438 may detect a flush termination or receive an error code or fault code from the write booster buffer 118 or other component of the flash memory device 402 that indicates that a flush was unsuccessful. The flush management module 438 may set a status flag as successful or unsuccessful (e.g., 1/0) based on the flush result and may communicate the status flag to the write booster module 432 to include the information in a notification to the host device 418. When the flush is successful, the flush management module 438 may unmap the flushed addresses or data structures (e.g., L2) of the write booster buffer 118 so that the flushed addresses are marked as available for writing further data. When a flush is unsuccessful and terminates early, the flush management module 438 may set a status, and may communicate the result to the device controller 116 or modules 430-436, and may determine a last data structure (e.g., L2) that was successfully flushed based on a memory table in the progress tracking module 436.

Upon determining a last data structure (e.g., L2) that was successfully flushed, the flush management module 438 may communicate the flush position corresponding to that data structure and may communicate a point of failure (e.g., an address) of the flush as context information to the write booster communication module 432 for transmission to the host device 418. The flush management module 438 may be configured to unmap successfully flushed data structures and not unmap the data structures that were not successfully flushed. The flush management module 438 may be configured to resume a flush of the SLC memory (e.g., write booster buffer 118) to TLC memory (e.g., normal memory 112) at the point after the last successfully flushed data structure (e.g., address after L2).

The description of the functionality provided by the different modules 430-438 is for illustrative purposes, and is not intended to be limiting, as any of modules 430-438 may provide more or less functionality than is described. For example, one or more of modules 430-438 may be eliminated, and some or all of its functionality may be provided by other ones of modules 430-438. As another example, processor(s) 422 may execute one or more additional modules that may perform some or all of the functionality attributed below to one of modules 430-438.

In some embodiments, the write booster buffer module 430, the write booster communication module 432, the progress tracking module 436, and the flush management module 438 may be implemented by a UFS device controller executing in the processor(s) 422 (e.g., device controller 116) of the FLASH memory device 402, which may be and/or may include processor 422.

Figure 5:
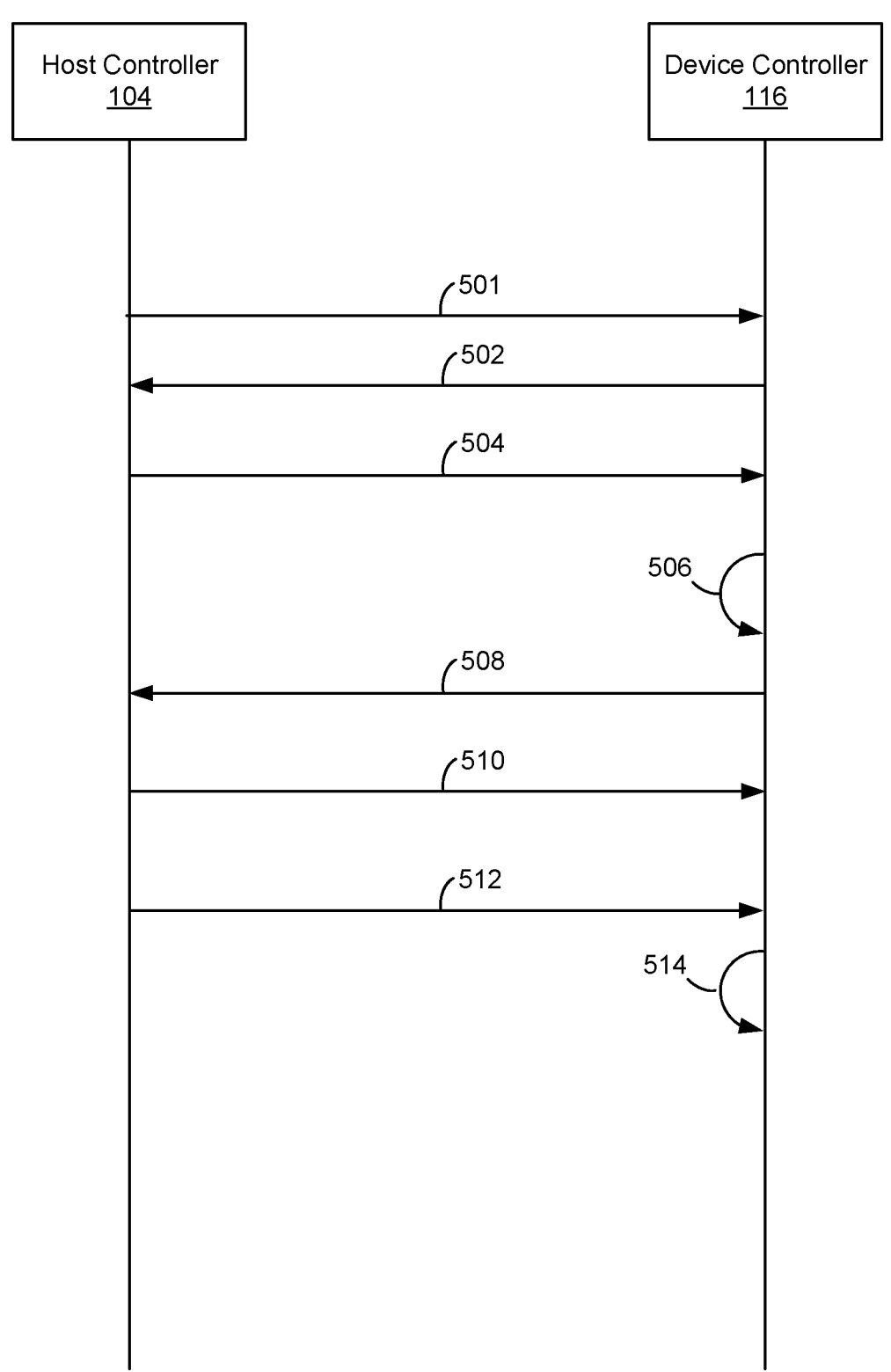
FIG. 5 is a signaling diagram illustrating an example of write booster buffer partial flush and resume processes according to some embodiments.

FIG. 5 is a signal flow and operations diagram illustrating an example of write booster buffer optimization according to some embodiments. With reference to FIGS. 1-5, a host controller 104 (e.g., 104, 418) of an SoC (e.g., SoC 102, 302) may be communicably connected to a device controller 116 of a UFS device (e.g., UFS device 106, 402, 372, processor 422) via a link (e.g., link 114). The host controller 104 and the device controller 116 may each include one or more processors in a processing system configured to execute computer code to implement computing operations. The host controller 104 and the UFS device controller 116 may each be configured to send and receive signals, which may include computing data and/or computing instructions, between components of a computing device including between each other, via the link.

The host controller 104 may send a command to the device controller 116 to flush the write booster buffer in operation 501. The device controller 116 may notify the host controller 104 that the flush was unsuccessful in operation 502. The host controller 104 may respond to receiving the notification with flush context read command in operation 504. The flush context read command may read one or more values and variables from the device controller 116 (e.g., progress tracking module 436) that describe the context information associated with the flush failure (e.g., error code, error position, last checkpoint). The device controller 116 may then execute the read request received from the host controller 104 in operation 506. The device controller 116 may then transmit, in operation 508, the context information (e.g., last flushed address) regarding the flush to the host controller 104. The host controller 104 may update one or more memory tables in DRAM 108 which describe the positions of data stored on the flash device (e.g., 402). The host controller 104 may then generate and transmit an unmap command (or partial unmap) to the device controller 116 in operation 510 to free the memory that was successfully flushed (if any). The device controller 116 may then unmap these memory addresses in one or more memory tables. The host controller 104 may then generate and transmit a flush resume command in operation 512 to the device controller 116. The device controller 116 may then resume the flushing of the SLC memory to the TLC memory in operation 514 starting at a position indicated by the checkpoint of the last data structure successfully flushed.

Figure 6:
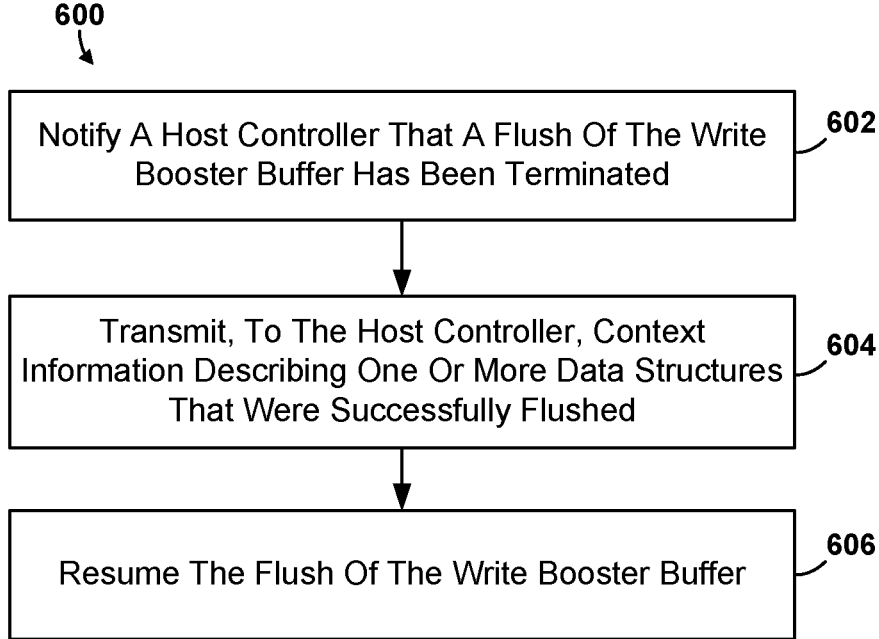
FIG. 6 is a process flow diagram of an example method of write booster buffer partial flush and resume in accordance with some embodiments.

FIG. 6 is a process flow diagram of an example method 600 that may be performed by a UFS device controller (e.g., by a processor or processing system within the UFS device controller) of a flash storage device for write booster buffer flush failure notification and resuming of the flush in accordance with various embodiments. With reference to FIGS. 1-6, the method 600 may be performed by a UFS device controller (e.g., device controller 116) of a flash storage device (e.g., 106, 402). The UFS device controller may include a one or more processors in a processing system (e.g., processor 322, 422) one or more of which may be configured by processor-executable instructions stored in a non-transitory processor-readable medium (e.g., memory 110) to perform operations of the method 600. Means for performing the operations of the method 600 may be the UFS device controller, the processor or processing system, and/or the like as described with reference to FIGS. 1-6. In order to encompass the alternative configurations enabled in various embodiments, the hardware implementing the method 600 is referred to herein as a "processing system."

In block 602, a UFS device controller of a flash storage device may notify a host controller that a flush of the write booster buffer has been terminated. In some embodiments, the notification of flush failure may cause the host controller 104 to delay one or more queued or scheduled commands (e.g., read/write commands) so that the rest process 600 may be performed. The notification may include an error code or reason for failure, which may be analyzed by the host controller 104 to determine if the error or fault is fixable (e.g., storage full) or permanent (e.g., wire disconnect). The notification of block 602 may be an interrupt in a wExceptionEventControl attribute (e.g., wExceptionEventControl [7]) which may notify the host that context for the failure is available.

In block 604, the UFS device controller of the flash storage device may transmit, to the host controller, context information describing one or more data structures that were successfully flushed. In some embodiments, the context information may include a check point corresponding to a data structure or address that was last successfully flushed. In some embodiments, the one or more data structures may be a plurality of levels, addresses, or blocks in write booster buffer memory indicated as flushed or not-flushed by a plurality of flush points corresponding to the plurality of levels, addresses, or blocks. In some embodiments, the context information transmitted in block 604 may include a flush completion position indicating a last successful flush point in the flush of the write booster buffer. In some embodiments, this block 604 may be combined with the operations of block 602 such that the context information is provided together with the failure notification. In some embodiments, the remaining block addresses that are unflushed may be provided as context information. The transmitting of the context information may be part of a response to a read request of the context information.

In block 606, the UFS device controller of the flash storage device may resume the flush of the write booster buffer. In some embodiments, the UFS device controller may resume the flush starting from a flush completion position (e.g., check point address) that was provided in the context information transmitted in block 604. The resumed flush may also be tracked using the remaining check points. Further, the UFS device controller may resume the flush at a later point (e.g., sequentially later) than the last successful checkpoint if an error is expected to re-occur. In other words, the UFS device controller of the flash storage device may resume the flush after the early termination (unexpected termination) at any given point in the write booster buffer 118.

Figure 7A:
FIG. 7A is a process flow diagram of an example method of write booster buffer partial flush and resume in accordance with some embodiments.
Figure 7A:
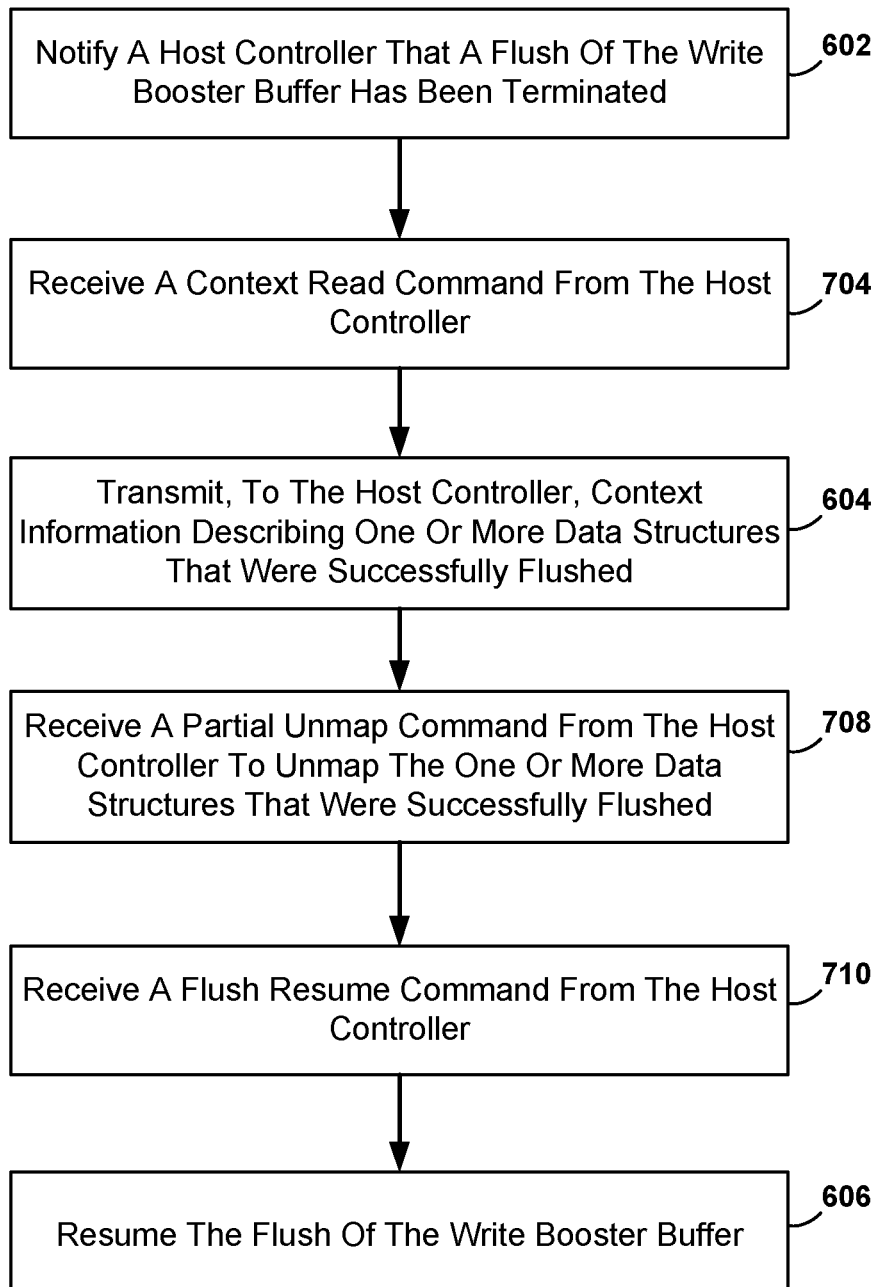

FIG. 7A is a process flow diagram of an example method 700 that may be performed by a device controller 116 (e.g., by a processor within the device controller) of a computing device for write booster buffer flush failure notification and resuming of the flush in accordance with various embodiments. With reference to FIGS. 1-7A, the method 700 may be performed by a device controller 116 or flash device (e.g., 106, 402) of a computing device (e.g., system 100, computing device 300). In some embodiments, the flash device may include one or more processors of a processing system (e.g., processor 422) configured to perform the operations by processor-executable instructions stored in a non-transitory processor-readable medium (e.g., memory 320, electronic storage 420). Means for performing the operations of the method 700 may be the device controller, the processor, and/or the like as described with reference to FIGS. 1-7A. With reference to FIGS. 1-7A, the method 700 may be performed in a computing device by processing system encompassing one or more processors (e.g., 310, 312, 314, 316, 318, 321, 322, 321, 322, 352, 360, etc.), components or subsystems discussed in this application. Means for performing the functions of the operations in the method 700 may include a processing system including one or more of processors 310, 312, 314, 316, 318, 321, 322, 321, 322, 352, 360, and other components described herein.

In some embodiments, the method 700 may be implemented in parallel (or together) with the method 600 described with reference to FIG. 6. For example, the UFS device controller implementing the method 700 may be the same as a UFS device controller and/or part of the UFS device described in the method 600, and the host controller implementing the method 700 may be the same as the host controller and/or part of the host device described for the method 600.

In block 602, the UFS device controller (e.g., 116) may notify a host controller that a flush of the write booster buffer has been terminated. The operations of block 602 of method 700 may operate as described for block 602 of method 600.

In block 704, the UFS device controller of the flash storage device may receive a context read command from the host controller. That is, the host controller may respond to the notification of the failed flush by requesting more information via a read request of context information. In other words, the host controller may be configured to request this context information or may be informed by the notification of block 602 that the context information exists.

In block 604 of method 700, the UFS device controller of the flash storage device may transmit, to the host controller, context information describing one or more data structures that were successfully flushed from the write booster buffer (e.g., 118). The operations of block 604 of method 700 may operate as described for block 604 of the method 600.

In block 708, the UFS device controller of the flash storage device may receive a partial unmap command from the host controller to unmap the one or more data structures that were successfully flushed. The host controller may designate one or more portions (e.g., data structures, addresses) of the write booster buffer to be unmapped (i.e., such that no data is mapped to the portion) to free the memory portion for further writes and accesses. These designated portions of memory in the write booster buffer may then be indicated in the unmap command (partial) or the device controller may interpret the unmap command to apply only to the successfully flushed portion of the write booster buffer (e.g., 118). The UFS device controller may initiate the unmap itself based on the stored checkpoints after transmitting the context information which provides the host controller with the information needed to unmap its own memory table entries.

In block 710, the UFS device controller of the flash storage device may receive a "flush resume" command from the host controller. The flush resume command may include a start point in the write booster buffer (e.g., 118) for the flush to resume at. The receipt of the flush resume command may be delayed from the completion of the unmap of block 708 if the host controller determines error correction needs to be performed or if more data needs to be written to the unmapped memory (e.g., for correction or replacement of data).

In block 606 of method 700, the UFS device controller of the flash storage device may resume the flush of the write booster buffer. The operations of block 606 may automatically follow the unmap or partial unmap of the successfully flushed memory portion. In other words, block 710 may be optional. The operations of block 606 of method 700 may operate as described for block 606 of method 600.

FIG. 7B is a process flow diagram of an example method 750 that may be performed by a host controller (e.g., by a processor within the host controller) of a computing device for write booster buffer flush failure notification and resuming of the memory flush in accordance with various embodiments. With reference to FIGS. 1-7B, the method 750 may be performed by a host controller (e.g., host controller 104, 362, 418) of a computing device (e.g., system 100, computing device 300). In some embodiments, the host controller may include a processor (e.g., processor 422) configured to perform the operations by processor-executable instructions stored in a non-transitory processor-readable medium (e.g., memory 320, electronic storage 420). Means for performing the operations of the method 750 may be the host controller, the processor, and/or the like as described with reference to FIGS. 1-7B. With reference to FIGS. 1-7B, the method 750 may be performed in a computing device by processing system encompassing one or more processors (e.g., 310, 312, 314, 316, 318, 321, 322, 321, 322, 352, 360, etc.), components or subsystems discussed in this application. Means for performing the functions of the operations in the method 750 may include a processing system including one or more of processors 310, 312, 314, 316, 318, 321, 322, 321, 322, 352, 360, and other components described herein.

In some embodiments, the method 750 may be implemented in parallel (or together) with the methods 600/700 described with reference to FIG. 6 and FIG. 7A. For example, the UFS device controller implementing the method 750 may be the same as a UFS device controller and/or part of the UFS device described in the method 600, and the host controller implementing the method 750 may be the same as the host controller and/or part of the host device described for the method 600/700.

In block 752, the host controller of an SoC (e.g., 102, 302) may receive a notification from a flash device that a flush of the write booster buffer has been terminated. As noted above, the notification may include a status of the write booster buffer and one or more error codes defining the error that terminated the memory flush. Block 752 may be the corresponding counterpart of the host controller to block 602 of methods 600/700 at the UFS device controller.

In block 754, the host controller of an SoC may transmit a context read command to the flash device (e.g., via link 114). Block 754 may be the corresponding counterpart of the host controller to block 704 of method 700 at the UFS device controller.

In block 756, the host controller of an SoC may receive a context information from the flash device describing one or more data structures that were successfully flushed. This context information may enable the host controller to update one or more memory tables stored on the SoC that map data stored on the flash device (e.g., 402). Block 756 may be the corresponding counterpart of the host controller to block 604 of methods 600/700 at the UFS device controller.

In block 758, the host controller of an SoC may transmit a partial unmap command to the flash device to unmap the one or more data structures that were successfully flushed. The partial unmap command and corresponding instructions may operate to synchronize the memory tables of the device controller with updates already made at the host controller, where these updates may be based on the context information. Block 758 may be the corresponding counterpart of the host controller to block 708 of method 700 at the UFS device controller.

In block 760, the host controller of an SoC may transmit a flush resume command to the flash device. The host controller may initiate the flush resume request (e.g., TWB_FLUSH_RESUME_REQ command) for a flush of the remaining data stored in SLC memory when the command queue of the host controller is empty. Block 760 may be the corresponding counterpart of the host controller to block 606 of methods 600/700 at the UFS device controller.

Figure 8:
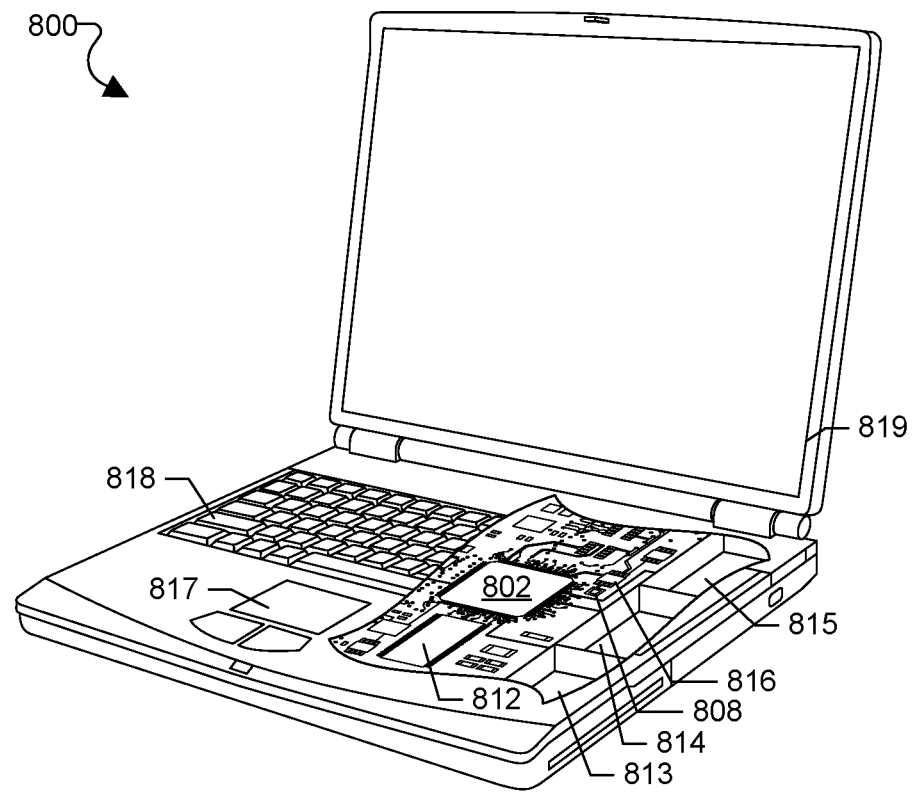
FIG. 8 is a component block diagram illustrating an example personal computer suitable for use with the various embodiments.

Various embodiments (including, but not limited to, embodiments described with reference to FIGS. 1-7B) may be implemented in a wide variety of computing systems, which may include a laptop computer 800 (e.g., computing device 100, 300, 402), an example of which is illustrated in FIG. 8. With reference to FIGS. 1-8, a laptop computer may include a touchpad touch surface 817 that serves as the computer's pointing device, and thus may receive drag, scroll, and flick gestures similar to those implemented on computing devices equipped with a touch screen display and described above. A laptop computer 800 will typically include a processor 802 coupled to volatile memory 812 and a large capacity nonvolatile memory, such as a disk drive 813 of Flash memory. Additionally, the computer 800 may have one or more antenna 808 for sending and receiving electromagnetic radiation that may be connected to a wireless data link and/or cellular telephone transceiver 816 coupled to the processor 802. The computer 800 may also include a floppy disc drive 814 and a compact disc (CD) drive 815 coupled to the processor 802. The laptop computer 800 may include a touchpad 817, a keyboard 818, and a display 819 all coupled to the processor 802. Other configurations of the computing device may include a computer mouse or trackball coupled to the processor (e.g., via a universal serial bus (USB) input) as are well known, which may also be used in conjunction with the various embodiments.

Figure 9:
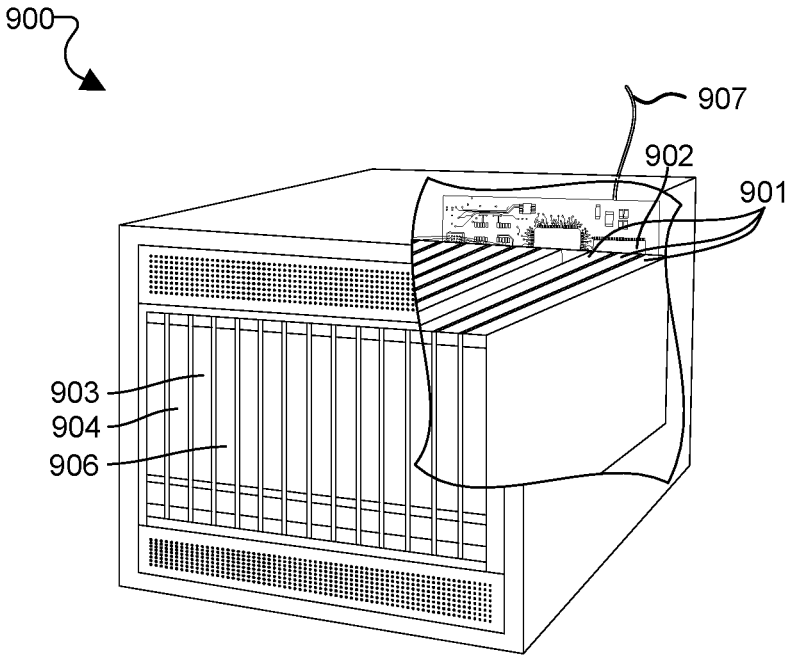
FIG. 9 is a component block diagram illustrating an example server suitable for use with the various embodiments.

FIG. 9 is a component block diagram of a computing device 900, such as a server, suitable for use with various embodiments. Such computing devices may include at least the components illustrated in FIG. 9. With reference to FIGS. 1-9, the computing device 900 (e.g., computing device 100, 300, 402) may include a processor 901 coupled to volatile memory 902 and a large capacity nonvolatile memory, such as a disk drive 903.

The computing device 900 may also include a peripheral memory access device such as a floppy disc drive, compact disc (CD) or digital video disc (DVD) drive 906 coupled to the processor 901. The computing device 800 may also include network access ports 904 (or interfaces) coupled to the processor 901 for establishing data connections with a network, such as the Internet and/or a local area network coupled to other system computers and servers.

The computing device 900 may include one or more antennas 907 for sending and receiving electromagnetic radiation that may be connected to a wireless communication link. The computing device 900 may include additional access ports, such as USB, Firewire, Thunderbolt, and the like for coupling to peripherals, external memory, or other devices.

Figure 10:
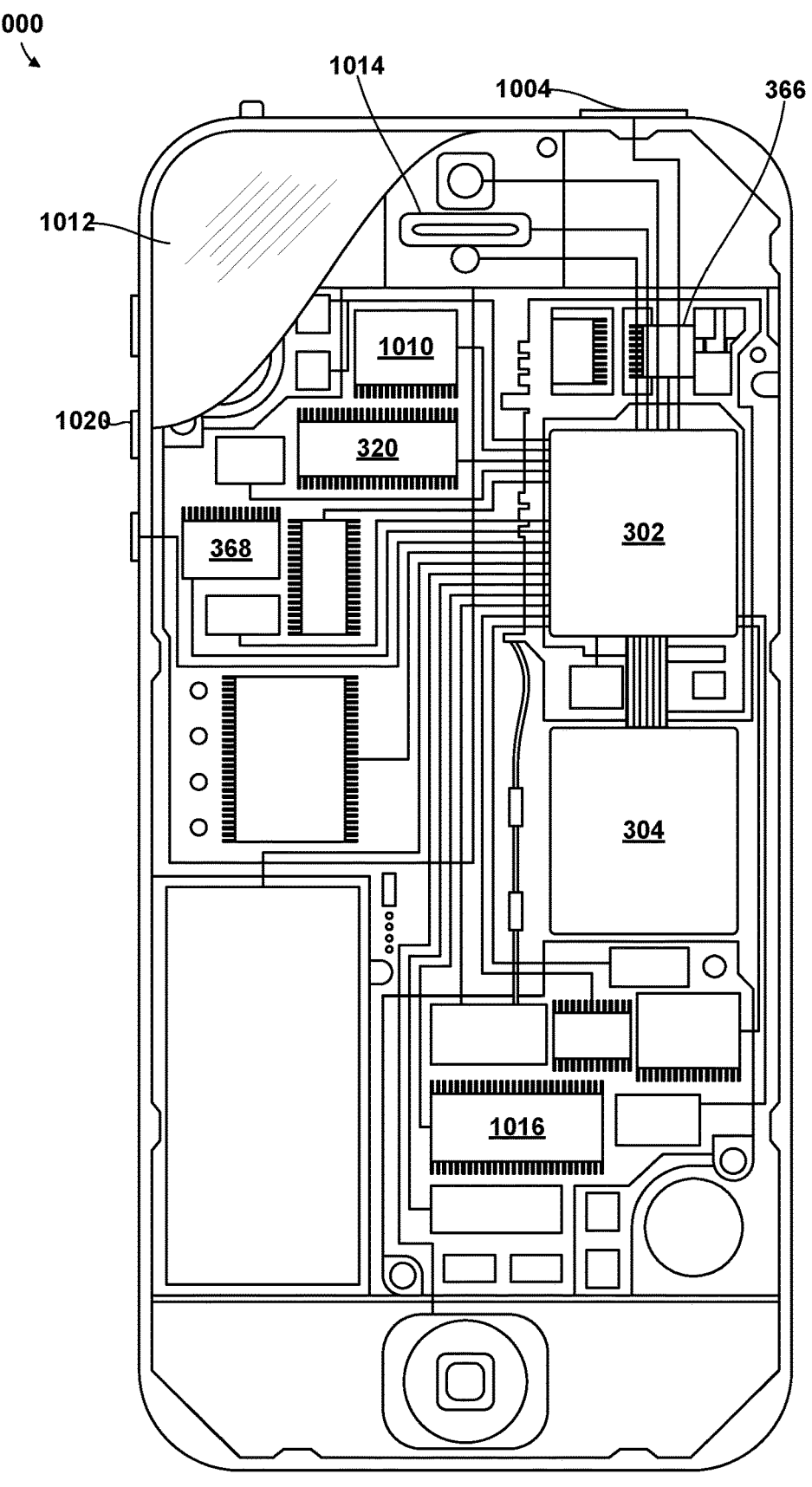
FIG. 10 is a component block diagram illustrating an example wireless communication device suitable for use with the various embodiments.

FIG. 10 is a component block diagram of a computing device 1000 suitable for use with various embodiments. With reference to FIGS. 1-10, various embodiments may be implemented on a variety of computing devices 1000 (e.g., computing device 100, 300, 402), an example of which is illustrated in FIG. 10 in the form of a smartphone. The computing device 1000 may include a first SoC 302 (e.g., a SoC-CPU) coupled to a second SoC 304 (e.g., a 5G capable SoC). The first and second SoCs 302, 304 may be coupled to internal memory 1016, a display 1012, and to a speaker 1014. The first and second SoCs 302, 304 may also be coupled to at least one SIM 368 and/or a SIM interface that may store information supporting a first 5GNR subscription and a second 5GNR subscription, which support service on a 5G non-standalone (NSA) network.

The computing device 1000 may include an antenna 1004 for sending and receiving electromagnetic radiation that may be connected to a wireless transceiver 366 coupled to one or more processors in the first and/or second SoCs 302, 304. The computing device 1000 may also include menu selection buttons or rocker switches 1020 for receiving user inputs.

The computing device 1000 also includes a sound encoding/decoding (CODEC) circuit 1010, which digitizes sound received from a microphone into data packets suitable for wireless transmission and decodes received sound data packets to generate analog signals that are provided to the speaker to generate sound. Also, one or more of the processors in the first and second SoCs 302, 304, wireless transceiver 366 and CODEC 1010 may include a digital signal processor (DSP) circuit (not shown separately).

The processors of the computer 800, the computing device 900, and the computing device 1000 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SoC 304 dedicated to wireless communication functions and one processor within an SoC 302 dedicated to running other applications. Software applications may be stored in memory 320, 1016 before they are accessed and loaded into the processor. The processors may include internal memory sufficient to store the application software instructions.

Implementation examples are described in the following paragraphs. While some of the following implementation examples are described in terms of example methods that may be performed in a computing device by a host controller, further example implementations may include: a computing device including a UFS device controller and a host controller configured to perform the methods of the following implementation examples; a computing device including means for performing functions of the following implementation examples, a UFS device controller and a host controller suitable for use in a computing device, in which the UFS device controller and the host controller each includes a processor configured to perform the methods of the following implementation examples; and a non-transitory, processor-readable memory having stored thereon processor-executable instructions configured to cause a UFS device controller and a host controller in a computing device configured to perform the methods of the following implementation examples.

Example 1. A method for managing operations of a write booster buffer of a flash memory device, including: notifying a host controller that a flush of the write booster buffer has been terminated; transmitting, to the host controller, context information describing one or more data structures that were successfully flushed; and resuming the flush of the write booster buffer.

Example 2. The method of example 1, in which, the one or more data structures are a plurality of levels, addresses, or blocks in write booster buffer memory indicated as flushed or not-flushed by a plurality of flush points corresponding to the plurality of levels, addresses, or blocks.

Example 3. The method of either of example 1 or 2, in which: transmitting the context information includes transmitting a flush completion position indicating a last successful flush point in the flush of the write booster buffer; and resuming the flush includes resuming the flush starting from the flush completion position provided in the context information.

Example 4. The method of any of examples 1-3, further including: receiving a context read command from the host controller, and transmitting the context information to the host controller in response to receiving the context read command.

Example 5. The method of any of examples 1-4, further including: receiving a flush resume command from the host controller, and resuming the flush of the write booster buffer in response to receiving the flush resume command.

Example 6. The method of any of examples 1-5, further including: receiving a partial unmap command from the host controller to unmap the one or more data structures that were successfully flushed.

Example 7. The method of example 6, in which, the partial unmap command allocates the one or more data structures that were successfully flushed to free memory.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to (i.e., configured to perform) a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for managing operations of a write booster buffer of a flash memory device, comprising:
notifying a host controller that a flush of the write booster buffer has been terminated;
transmitting, to the host controller, context information describing one or more data structures that were successfully flushed; and
resuming the flush of the write booster buffer.

2. The method of claim 1, wherein the one or more data structures are a plurality of levels, addresses, or blocks in write booster buffer memory indicated as flushed or not-flushed by a plurality of flush points corresponding to the plurality of levels, addresses, or blocks.

3. The method of claim 1, wherein:
transmitting the context information comprises transmitting a flush completion position indicating a last successful flush point in the flush of the write booster buffer; and
resuming the flush comprises resuming the flush starting from the flush completion position provided in the context information.

4. The method of claim 1, further comprising:
receiving a context read command from the host controller; and
transmitting the context information to the host controller in response to receiving the context read command.

5. The method of claim 1, further comprising:
receiving a flush resume command from the host controller; and
resuming the flush of the write booster buffer in response to receiving the flush resume command.

6. The method of claim 1, further comprising:
receiving a partial unmap command from the host controller to unmap the one or more data structures that were successfully flushed.

7. The method of claim 6, wherein the partial unmap command allocates the one or more data structures that were successfully flushed to free memory.

8. A flash storage device, comprising:
a plurality of logical units of memory;
a write booster buffer; and
a device controller coupled to the plurality of logical units of memory and the write booster buffer, wherein the device controller is configured to:
notify a host controller that a flush of the write booster buffer has been terminated;
transmit, to the host controller, context information describing one or more data structures that were successfully flushed; and
resume the flush of the write booster buffer.

9. The flash storage device of claim 8, wherein the one or more data structures are a plurality of levels, addresses, or blocks in write booster buffer memory indicated as flushed or not-flushed by a plurality of flush points corresponding to the plurality of levels, addresses, or blocks.

10. The flash storage device of claim 8, wherein the device controller is further configured to:
transmit context information that includes a flush completion position indicating a last successful flush point in the flush of the write booster buffer; and
resume the flush of the write booster buffer starting from the flush completion position provided in the context information.

11. The flash storage device of claim 8, wherein the device controller is further configured to:
receive a context read command from the host controller; and
transmit the context information to the host controller in response to receiving the context read command.

12. The flash storage device of claim 8, wherein the device controller is further configured to:
receive a flush resume command from the host controller; and
resume the flush of the write booster buffer in response to receiving the flush resume command.

13. The flash storage device of claim 8, wherein the device controller is further configured to:

receive a partial unmap command from the host controller to unmap the one or more data structures that were successfully flushed.

14. The flash storage device of claim 13, wherein the partial unmap command allocates the one or more data structures that were successfully flushed to free memory.

15. A flash storage device, comprising means:

means for notifying a host controller that a flush of the write booster buffer has been terminated;

means for transmitting, to the host controller, context information describing one or more data structures that were successfully flushed; and means for resuming the flush of the write booster buffer.

16. The flash storage device of claim 15, wherein the one or more data structures are a plurality of levels, addresses, or blocks in write booster buffer memory indicated as flushed or not-flushed by a plurality of flush points corresponding to the plurality of levels, addresses, or blocks.

17. The flash storage device of claim 15, wherein means for transmitting the context information comprises means for transmitting a flush completion position indicating a last successful flush point in the flush of the write booster buffer, and wherein means for resuming the flush resumes the flush starting from the flush completion position provided in the context information.

18. The flash storage device of claim 15, further comprising:

means for receiving a context read command from the host controller; and means for transmitting the context information to the host controller in response to receiving the context read command.

19. The flash storage device of claim 15, further comprising:

means for receiving a flush resume command from the host controller; and means for resuming the flush of the write booster buffer in response to receiving the flush resume command.

20. The flash storage device of claim 15, further comprising:

means for receiving a partial unmap command from the host controller to unmap the one or more data structures that were successfully flushed.

21. The flash storage device of claim 20, wherein the partial unmap command allocates the one or more data structures that were successfully flushed to free memory.

22. A non-transitory processor-readable medium having stored thereon processor-executable instructions configured to cause a device controller of a flash storage device to perform operations comprising:

notifying a host controller that a flush of the write booster buffer has been terminated;

transmitting, to the host controller, context information describing one or more data structures that were successfully flushed; and resuming the flush of the write booster buffer.

23. The non-transitory processor-readable medium of claim 22, wherein the one or more data structures are a plurality of levels, addresses, or blocks in write booster buffer memory indicated as flushed or not-flushed by a plurality of flush points corresponding to the plurality of levels, addresses, or blocks.

24. The non-transitory processor-readable medium of claim 22, wherein the stored processor-executable instructions are further configured to cause the device controller of a flash storage device to perform operations such that:

transmitting the context information includes transmitting a flush completion position indicating a last successful flush point in the flush of the write booster buffer; and resuming the flush comprises resuming the flush starting from the flush completion position provided in the context information.

25. The non-transitory processor-readable medium of claim 22, wherein the stored processor-executable instructions are configured to cause the device controller to perform operations further comprising:

receiving a context read command from the host controller; and transmitting the context information to the host controller in response to receiving the context read command.

26. The non-transitory processor-readable medium of claim 22, wherein the stored processor-executable instructions are configured to cause the device controller to perform operations further comprising:

receiving a flush resume command from the host controller; and resuming the flush of the write booster buffer in response to receiving the flush resume command.

27. The non-transitory processor-readable medium of claim 22, wherein the stored processor-executable instructions are configured to cause the device controller to perform operations further comprising:

receiving a partial unmap command from the host controller to unmap the one or more data structures that were successfully flushed.

28. The non-transitory processor-readable medium of claim 22, wherein the partial unmap command allocates the one or more data structures that were successfully flushed to free memory.

* * * * *